(12) United States Patent  
Kurosawa et al.

(10) Patent No.: US 6,254,059 B1  
(45) Date of Patent: Jul. 3, 2001

(54) ELECTRICALLY OPERATED FLOW CONTROL VALVE

(75) Inventors: Naoya Kurosawa; Hitoshi Umezawa; Yasushi Inoue, all of Tokyo (JP)

(73) Assignee: Fujikoki Corporation, Tokyo (JP)

( * ) Notice: Subject to any disclaimer, the term of this patent is extended or adjusted under 35 U.S.C. 154(b) by 0 days.

(21) Appl. No.: 09/385,630

(22) Filed: Aug. 27, 1999

(30) Foreign Application Priority Data

| Nov. 5, 1998 | (JP) | 10-314527 |
| Jun. 18, 1999 | (JP) | 11-172311 |
| Jul. 6, 1999 | (JP) | 11-191503 |

(51) Int. Cl.[7] ............... F16K 31/02; F17D 3/00; E03B 3/00
(52) U.S. Cl. .............. 251/129.11; 137/15; 137/382
(58) Field of Search .............. 251/129.11; 137/15, 137/377, 382

(56) References Cited

U.S. PATENT DOCUMENTS

| 1,652,038 | * | 12/1927 | Meyer | 137/377 |
| 4,584,902 | * | 4/1986 | Fry | 251/129.11 |
| 4,763,874 | * | 8/1988 | Ogawa | 251/129.11 |
| 4,930,746 | * | 6/1990 | Reinickie et al. | 251/129.11 |
| 5,179,977 | * | 1/1993 | Iwata et al. | 251/129.11 |
| 5,240,227 | * | 8/1993 | Sich | 251/129.16 |
| 5,597,009 | * | 1/1997 | Scherrer et al. | 251/129.11 |
| 5,680,880 | * | 10/1997 | Miyake et al. | 251/129.11 |

FOREIGN PATENT DOCUMENTS

0191377 * 11/1983 (JP) .................. 251/129.11

* cited by examiner

*Primary Examiner*—Kevin Shaver  
*Assistant Examiner*—David Bonderer  
(74) *Attorney, Agent, or Firm*—Armstrong, Westerman, Hattori, McLeland & Naughton, LLP

(57) ABSTRACT

An electrically operated flow control valve 100 comprises a can 160 fixed to the upper portion of a valve body 110. A rotor member 130 is equipped inside a can 160, and a stator member not shown in the drawing is equipped to the exterior of the can 160. The can is formed by press-working a metal plate, and a flange portion 164 is formed to the opening. The can 160 is welded onto the valve body 110, and a box nut 180 is used to firmly fix the can to the body, thereby improving the pressure resistibility of the valve.

6 Claims, 12 Drawing Sheets

ELECTRICALLY OPERATED FLOW CONTROL VALVE

FIELD OF THE INVENTION

The present invention relates to an electrically operated flow control valve for controlling the flow of liquid, such as a refrigerant used in a refrigeration cycle of an air conditioner and the like, and particularly, to a flow control valve suited for controlling the flow of $CO_2$ refrigerant, and the like, used under high pressure.

DESCRIPTION OF THE RELATED ART a priorly known electrically operated flow control valve to be used in a refrigeration cycle is shown in FIG. 12. An electrically operated flow control valve 10 shown in the drawing comprises a first passage 22 and a second passage 23 communicated on a valve chamber 21, a valve body 20 including a valve seat 24 formed to the side of the second passage 23, a valve shaft 30 having a needle valve 31 mounted so as contact to and separate from the valve seat 24, a seal case 42 having a lower cover 41 welded onto the upper portion of the valve body 20 and a cylindrical can 40, and a motor 50, such as a stepping motor and the like, having a stator portion 52 with a stator coil 51 mounted on the exterior of the seal case 42 and a rotor portion 53 placed inside said seal case 42.

The rotor portion 53 comprises a magnet 54 surrounding the outer periphery thereof, and includes a sleeve 55 having a cylindrical bush 55b, on the inner periphery of which is formed a female screw portion 55a engaging to a male screw portion 25a of a fixing guide 25 vertically positioned inside the valve body 20. The sleeve 55 is equipped with a limiting protrusion 56 for contacting a stopper 43 so as to limit the full-open position of the valve, and a limiting protrusion 57 for contacting a stopper 26 placed on the side of the valve body 20 so as to limit the full-close position of the valve. Further, the valve shaft 30 is connected to the upper end of the sleeve 55 by an E-ring 33.

When the stator coil 51 of the stator portion 52 is excited by a pulse signal received from the outside, the rotor portion 53 is rotated for a predetermined amount based on the pulse signal. Such rotation moves the valve shaft 30 connected to the sleeve 55 of the rotor portion 53 in a vertical direction. Thereby, the space between the needle valve portion 31 and the valve seat 24 is adjusted, and the flow of the refrigerant traveling through said space may be controlled.

SUMMARY OF THE INVENTION

The electrically operated flow control valve 10 of the prior art explained above is designed to control the flow of refrigerant, such as flon, which is normally used under low pressure of approximately 30 kg/cm$^2$. When using such conventional flow control valve 10 for controlling the flow of refrigerant, such as $CO_2$, and the like, used as an alternate refrigerant, since such refrigerant is used under high pressure of approximately 150–250 kg/cm$^2$, a crack may occur in the portion of the lower cover 41 welded and fixed to the upper portion of the valve body 20. When such cracking occurs, a problem may occur in which the refrigerant, such as $CO_2$, and the like, leaks to the exterior.

Therefore, the present invention is aimed at solving such problem, and the object of the invention is to provide an electrically operated flow control valve capable of performing the flow control of refrigerants, such as $CO_2$ and the like, used under high pressure, by forming a firm connection between the can and the valve body.

In order to achieve the above object, the electrically operated flow control valve according to the present invention comprises a valve body, a cylindrical can fixed to the upper portion of said valve body, and a motor including a rotor disposed within the interior of said can and a stator disposed on the exterior of said can, as the basic means. Further, the present invention includes means for fixing said can to said valve body including an outwardly extended flange portion formed on the opening of said can, a weld joint connecting said flange portion and said valve body, a screw portion formed on said valve body, and a box nut fit on said flange portion of said can and engaged with said screw portion of said valve body.

Further, means for fixing said can to said valve body includes a weld joint connecting said can and said valve body, a ring groove or plurality of concave portions formed on said valve body, and a caulking portion formed from the exterior of said can toward the inward direction so as to contact said ring groove or said concave portions of said valve body.

Even further, means for fixing said can to said valve body includes a screw portion formed to said valve body, a box nut being engaged to said screw portion, and a wedge-like ring member inserted between said valve body and said can so as to receive pressure from said box nut.

Moreover, means for fixing said can to said valve body includes a flange member welded to the opening of said can, and a plural number of bolts for fixing said flange member to said valve body.

Further, means for fixing said can to said valve body includes an outwardly extended step portion formed on the opening of said can, a flange member having a rim portion so as to interfit with said step portion of the can, and a plural number of bolts for fixing said flange member to said valve body.

Moreover, the electrically operated flow control valve according to another aspect of the present invention comprises a valve body, a cylindrical can fixed to the upper portion of said valve body, and a motor including a rotor disposed within interior of said can and a stator disposed on the exterior of said can, wherein a thickened portion is formed around an opening of said can, and said can is fixed to said valve body by said thickened portion being screwed onto said valve body and the contact portion between said can and said valve body being welded together.

According to the electrically operated flow control valve of the present invention having the above-mentioned structure, the can and the valve body are connected to each other through welding, and at the same time, the can and the valve body are fixed either through a box nut, or by caulking the can to the valve body. This enables the flow control valve to endure a long-term active pressure while maintaining the sealed state and preventing the can and the valve body from separating, thereby improving the reliability of the valve.

Moreover, according to another aspect of the invention, the fixture of the can and the valve body is performed by use of a wedge-shaped ring inserted therebetween, so the sealed state may be maintained and the reliability of the valve is improved even without forming a welded portion.

According to another aspect of the invention, the flange portion welded onto the opening of the can is further fixed to the valve body by bolts, so that a sealed state is created between the can and the valve body, and the can and the valve body is securely prevented from separating.

In yet another aspect of the invention, a step portion is formed about the opening of the can, and a flange portion being interfit to the step portion is fixed to the valve body through bolts. Even when the pressure inside the can is increased by refrigerants used under high pressure, such as $CO_2$, the connection between the can and the valve body may be maintained firmly, and the sealed state may be retained.

PREFERRED EMBODIMENT OF THE INVENTION

A preferred embodiment of the electrically operated flow control valve according to the present invention will now be explained with reference to the drawings.

Figure 1:
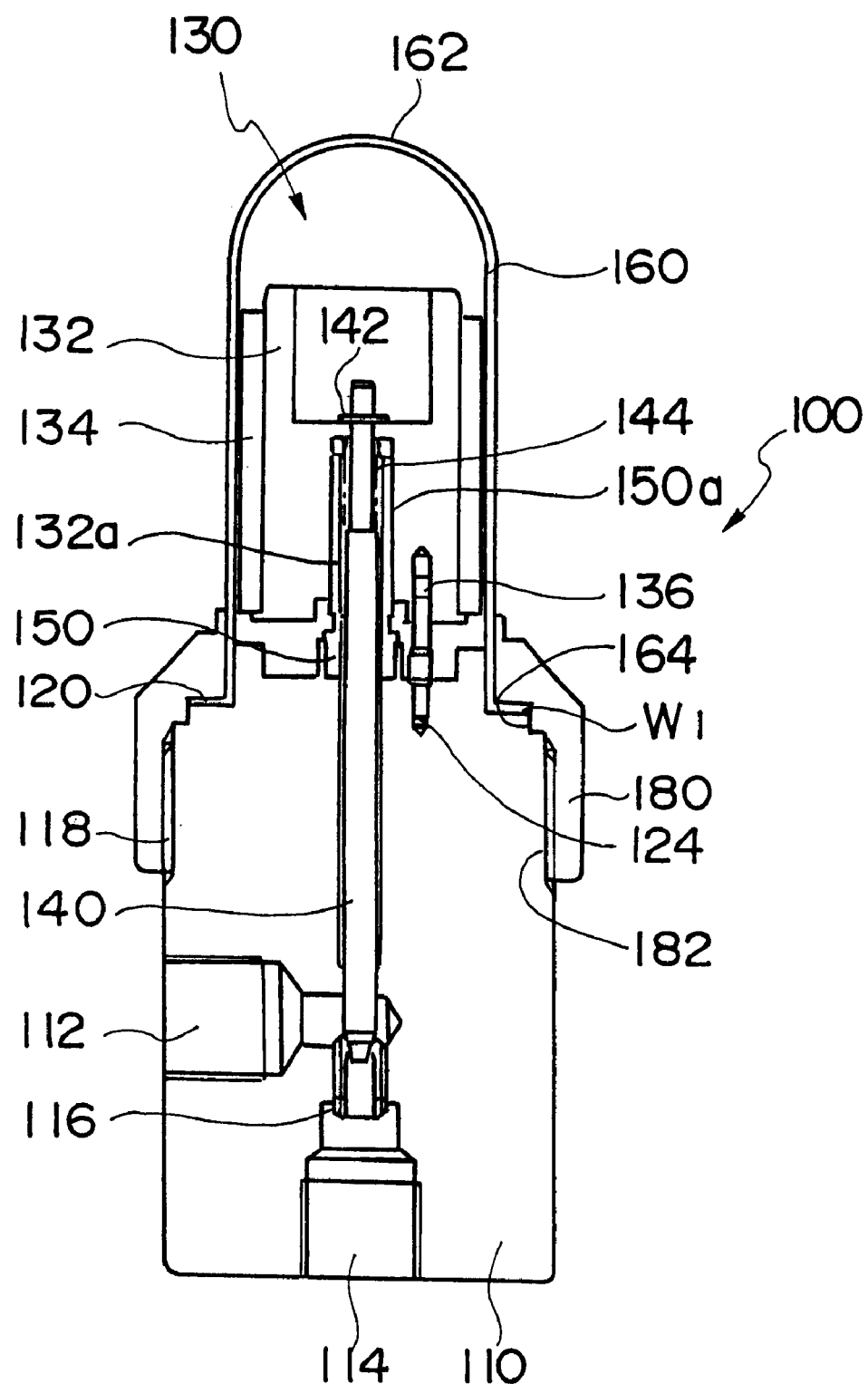
FIG. 1 is a cross-sectional view showing one embodiment of the electrically operated flow control valve according to the present invention.

FIG. 1 is a vertical cross-sectional view of one embodiment of the flow control valve according to the present invention showing the state in which a stator member is removed therefrom.

An electrically operated flow control valve designated generally by the reference number 100 comprises a cylindrically shaped valve body 110. The valve body 110 is made for example of stainless steel material, and comprises a first passage 112, a second passage 114, and an orifice member 116 mounted between the first passage 112 and the second passage 114.

A rotor member 130 is equipped inside a can 160, and the rotor member includes an integrally assembled magnet member 134 placed on the outer peripheral portion of a sleeve 132.

In the center of the sleeve 132 is formed a female screw portion 132a, which engages a male screw portion 150a formed to the outer peripheral portion of a guide member 150 vertically disposed in the valve body 110.

A valve shaft 140 is penetrated through the center portion of the sleeve 132, and the shaft is supported by a fixing member 142 such as an E-ring and the like. The valve shaft 140 is normally biased toward the orifice member 116 by a spring 144 mounted between the shaft and the sleeve 132.

A pin 136 mounted on the sleeve 132 makes contact with a stopper 124 mounted to the valve body 110 when the rotor member 130 descends to its lowermost position, thereby limiting the lower limit position of the rotor member.

The can 160 is formed, for example, by press-working a stainless steel material. The peak portion of the can is formed as a dome portion 162, so as to effectively receive the inner pressure. The lower area of the can is formed to have a straight pipe-like shape with an opening, and a flange portion 164 is formed around the opening and extending outward.

The contact surface of the can 160 to the valve body 110 is formed by the flange portion 164 extending outward from the opening of the can 160, which contacts a shoulder portion 120 formed to the upper surface of the valve body 110.

The can 160 is fixed to the valve body 110 by a weld joint $W_1$ formed to the contact portion between the flange 164 and the valve body 110.

A male screw portion 118 is formed on the upper area of the valve body 110. By utilizing a box nut 180, a female screw portion 182 of the box nut 180 is engaged to the male screw portion 118 of the valve body 110, so as to fix the flange portion 164 of the can 160 to the shoulder portion 120 of the valve body 110 through the box nut 180.

According to the electrically operated flow control valve 100 of the present embodiment formed as above, when power is provided to a stator (not shown) so as to excite the stator, the rotor member 130 is rotated, and the female screw portion starts to engage to the male screw portion. The screwing action rotates the valve shaft 140, and, according to the power supply direction, the valve shaft 140 is moved in the descending direction, thereby closing the orifice member 116 as a result. When opening the orifice member 116, power is excited in the opposite direction, thereby rotating the valve shaft 140 in the opposite direction, and as a result, opening the orifice member 116.

As explained above, the present flow control valve 100 includes a weld joint $W_1$ for welding and connecting the flange portion 164 of the can 160 to the valve body 110, and a box nut is used to further connect the can 160 and the valve body 110 securely. The weld joint and the box nut not only serve to maintain a strong fixture between the can 160 and the valve body 110, but also provide a sealing effect thereto, which enables the control valve to endure a long-term active pressure while preventing the can 160 and the valve body 110 from separating.

Figure 2:
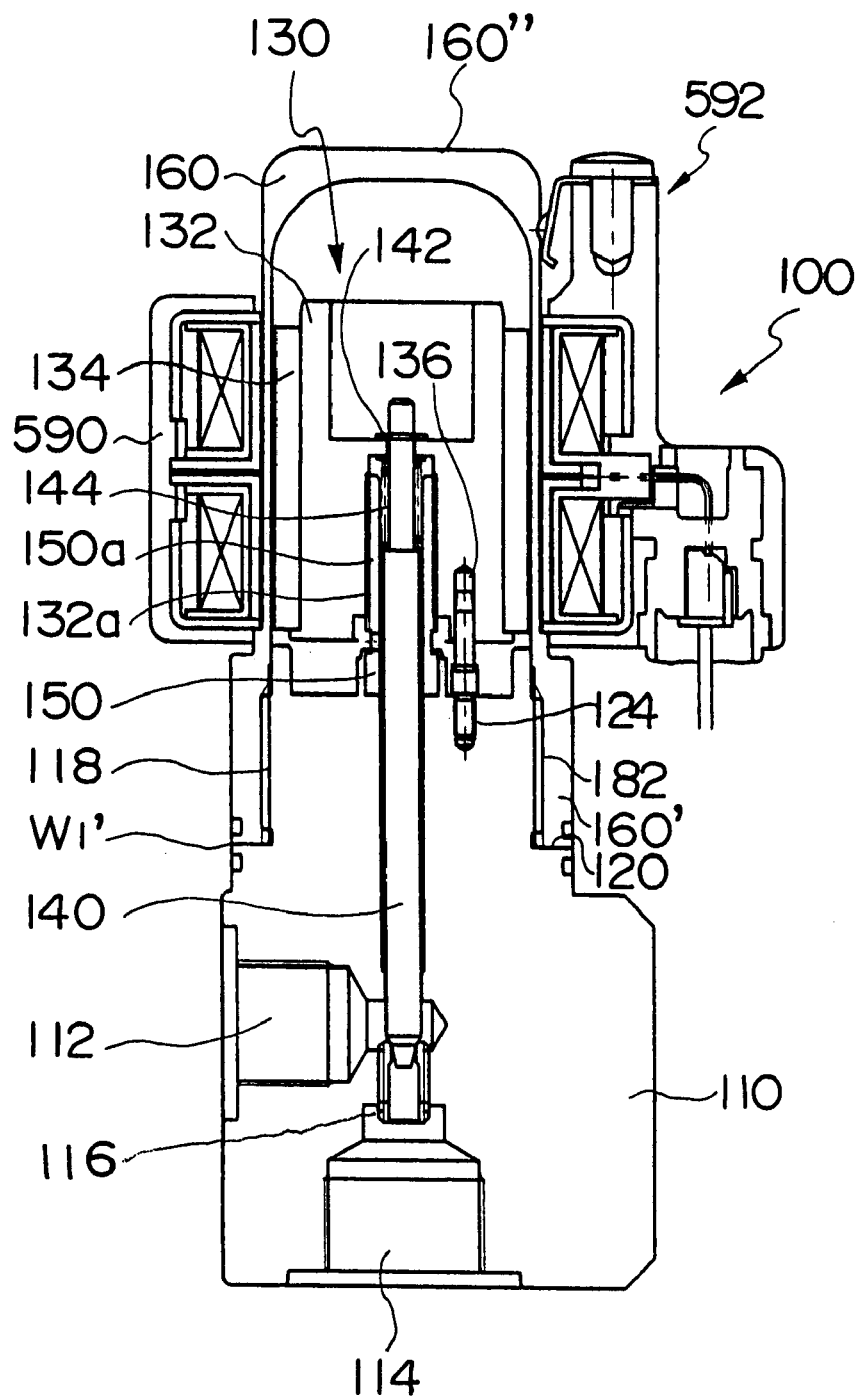
FIG. 2 is a cross-sectional view showing another embodiment of the electrically operated flow control valve according to the present invention.

The embodiment shown in FIG. 1 refers to fixing the flange portion 164 of the can 160 to the valve body 110 by use of a box nut 180. However, the present invention is not limited to such composition. For example, a thickened portion with steps may be formed integrally around the opening of the can 160, and by forming a female screw portion in the thickened portion and screwing the thickened portion onto the male screw portion formed to the valve body 110, the can and the valve body may be fixed securely together. FIG. 2 is a view showing such embodiment of the flow control valve, wherein reference number 160' refers to a thickened portion with steps formed to the can 160, and a female screw portion 182' formed to the thickened portion 160' is screwed onto the male screw portion 118 of the valve body 110 until the can contacts the shoulder portion 120 of the valve body 110, thereby fixing the can to the valve body. The can 160 is further welded onto the valve body 110 at the contact portion therebetween, and a weld joint $W_1$ is formed thereto. In the embodiment shown in FIG. 2, a stator 590 is equipped to the can 160 through a stopper means 592 which fixes the stator 590 to the can 160, and the can 160 includes a peak portion formed as a thickened flat portion 160". Other structures of the flow control valve shown in FIG. 2 are the same as that shown in FIG. 1, and therefore, the elements of FIG. 2 common to that of FIG. 1 are shown by the same reference members, and the explanations thereof are omitted.

Figure 3:
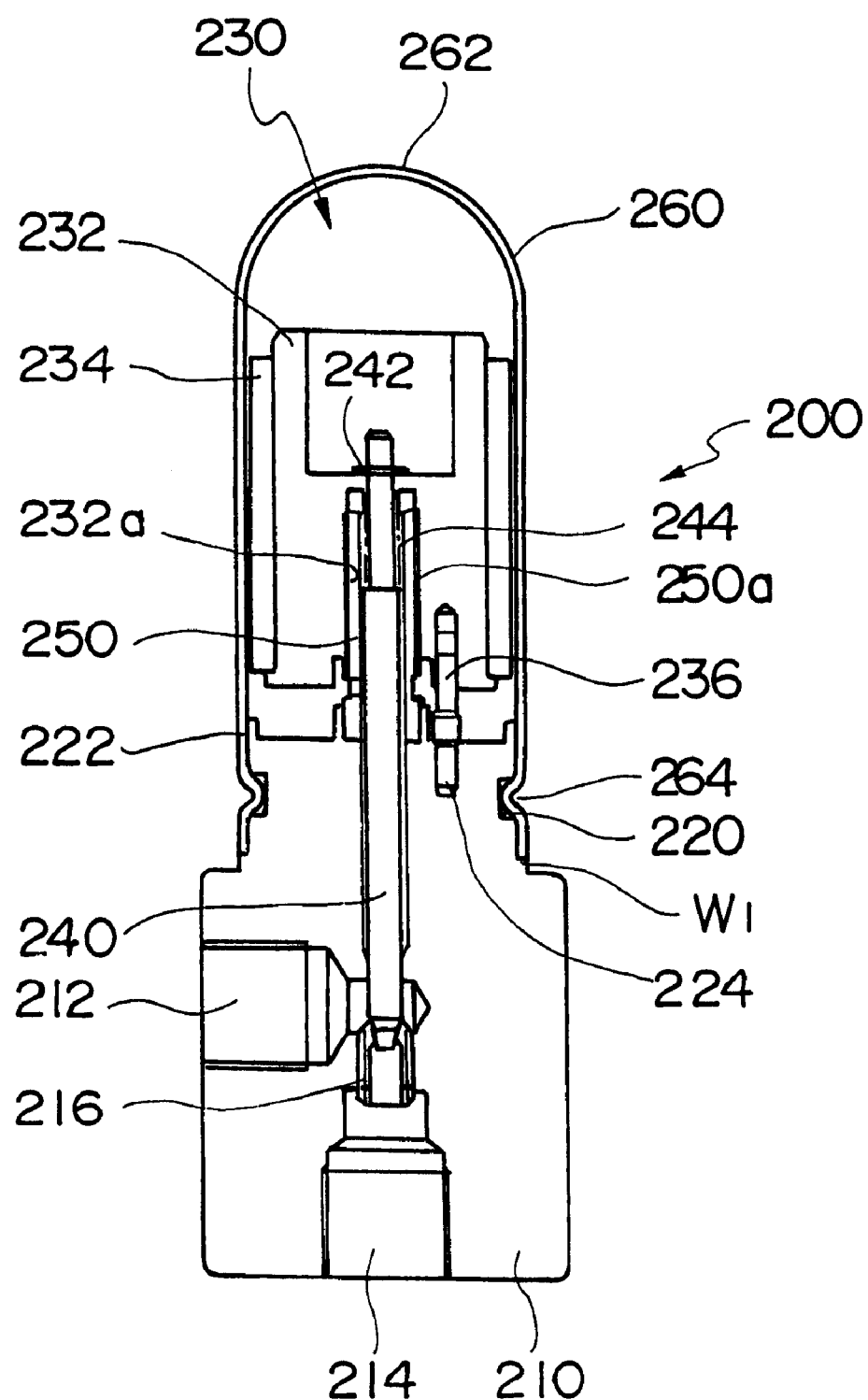
FIG. 3 is a cross-sectional view showing another embodiment of the electrically operated flow control valve according to the present invention.

FIG. 3 is a cross-sectional view according to another embodiment of the electrically operated flow control valve, showing the state in which a stator member if removed therefrom.

An electrically operated flow control valve indicated generally by the reference number 200 comprises a cylindrically shaped valve body 210. The valve body 210 is made for example of stainless steel material, and comprises a first passage 212, a second passage 214, and an orifice member 216 mounted between the first passage 212 and the second passage 214.

A rotor member 230 is equipped inside a can 260, and the rotor member includes an integrally assembled magnet member 234 placed to the outer peripheral portion of a sleeve 232.

In the center of the sleeve 232 is formed a female screw portion 232a, which engages to a male screw portion 250a formed to the outer peripheral portion of a guide member 250 vertically equipped in the valve body 210.

A valve shaft 240 is penetrated through the center portion of the sleeve 232, and the shaft is supported by a fixing member 242 such as an E-ring and the like. The valve shaft 240 is normally biased toward the orifice member 216 by a spring 244 mounted between the shaft and the sleeve 232.

A pin 236 mounted to the sleeve 232 makes contact with a stopper 224 mounted to the valve body 210 when the rotor member 230 descends to its lowermost position, thereby limiting the lower limit position of the rotor member.

The can 260 is formed for example by press-working a stainless steel material. The peak portion of the can is formed as a dome portion 262, so as to effectively receive the inner pressure. The lower area of the can is formed to have a straight pipe-like shape with an opening.

In the upper area of the valve body 210 is formed a narrowed portion 222, and to the outer peripheral of the narrowed portion is formed a groove or plurality of concave portions 220.

The opening of the can 260 is fit to the narrowed portion 222 of the valve body 210, and the contact portion between the can and the valve body is fixed by a weld joint $W_1$.

Thereafter, either a rolling process or a caulking process is performed from the exterior of the can 260 so as to form a concave portion 264 to the can 260, and thereby mechanically connecting the can and the valve body 210.

Similarly as the embodiment of FIG. 1, the flow control valve 200 according to the present embodiment opens or closes the orifice member 216 through the valve shaft 240.

As explained, the electrically operated flow control valve 200 according to the present embodiment includes connecting the opening of the can 260 to the valve body 210 by a weld joint $W_1$, and further connecting the can 260 to the valve body 210 by a rolling process or a caulking process, which realizes a firm fixture between the can 260 and the valve body 210, and provides a sealing effect thereto. Even further, since the can 260 and the valve body 210 are connected through a caulking portion, a small-sized flow control valve may be realized which will sufficiently endure a long-term active pressure while preventing the can 260 and the valve body 210 from separating.

Figure 4:
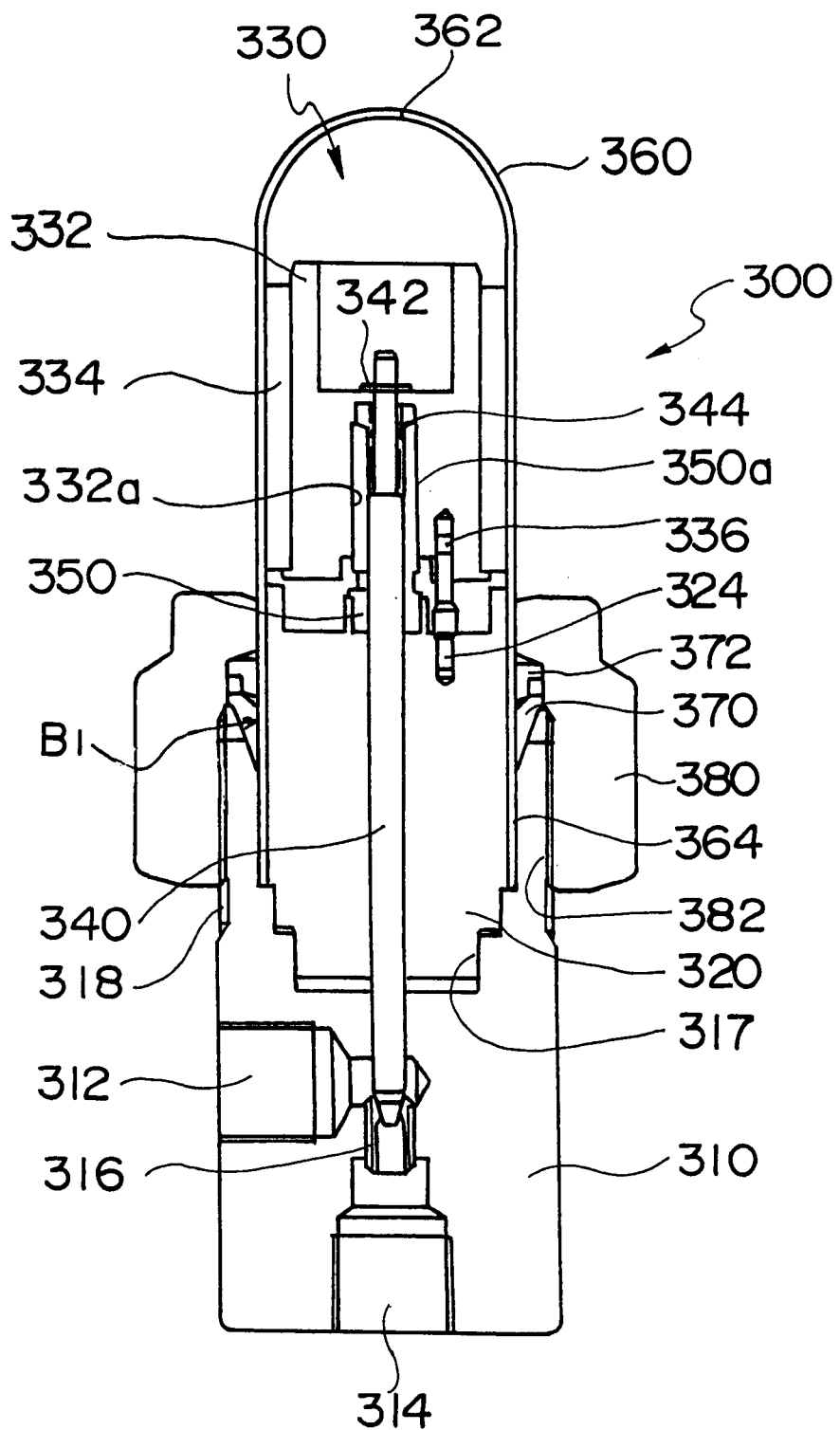
FIG. 4 is a cross-sectional view showing another embodiment of the electrically operated flow control valve according to the present invention.

FIG. 4 is a vertical cross-sectional view of another embodiment of the flow control valve according to the present invention, showing the state in which a stator member is removed therefrom.

An electrically operated flow control valve indicated generally by the reference number 300 comprises a cylindrically shaped valve body 310. The valve body 310 is made, for example of stainless steel material and comprises a first passage 312, a second passage 314, and an orifice member 316 mounted between the first passage 312 and the second passage 314.

A can 360 is formed, for example, by press-working a stainless steel material. A rotor member 330 is equipped inside the can 360, and the rotor member includes an integrally assembled magnet member 334 placed on the outer peripheral portion of a sleeve 332.

In the center of the sleeve 332 is formed a female screw portion 332a, which engages to a male screw portion 350a formed to the outer peripheral portion of a guide member 350 vertically disposed on an inner-cylinder member 320 fit to a step portion 317 of the valve body 310.

A valve shaft 340 is penetrated through the center portion of the sleeve 332, and the shaft is supported by a fixing member 342, such as an E-ring and the like. The valve shaft 340 is normally biased toward the orifice member 316 by a spring 344 mounted between the shaft and the sleeve 332.

A pin 336 mounted to the sleeve 332 makes contact with a stopper 324 mounted to the cylinder member 320 when the rotor member 330 descends to its lowermost position, thereby limiting the lower limit position of the rotor member.

The can 360 comprises a peak portion formed as a dome portion 362, and the lower end of the can is formed as a straight pipe-like portion 364 with an opening.

The can 360 is sandwiched and fixed between the valve body 310 and the inner-cylinder member 320. With two wedge-shaped first ring member 370 and second ring member 372 (so-called a swage lock) mounted therebetween, a box nut 380 is engaged to a screw portion 318 formed to the valve body 310. The two wedge-shaped ring members 370 and 372 receiving pressure from the box nut 380 presses the can 360 strongly from the outside to the inner direction by their wedging action, and thereby create a deformed portion $B_1$ which protrudes inwardly.

Similar to the flow control valves according to embodiments shown in FIGS. 1 and 2, the flow control valve 300 of the present embodiment also operates the orifice member 316 to be opened and closed by a valve shaft 340.

As explained above, the electrically operated flow control valve 300 includes sandwiching the can 360 between the valve body 310 and the inner-cylinder member 320, and fixing the can to the valve body and the inner-cylinder member 320 by a swage lock means. Accordingly, the present embodiment enables to maintain a firm fixture without the use of a weld joint, thereby realizing a valve formed by reduced assembling steps.

By the above-explained fixing structure, the can 360 may be fixed to the valve body 310 with high rigidity, and the integrally fixed can and valve body maintain a sufficient durability against the inner pressure of the can 360.

Figure 5:
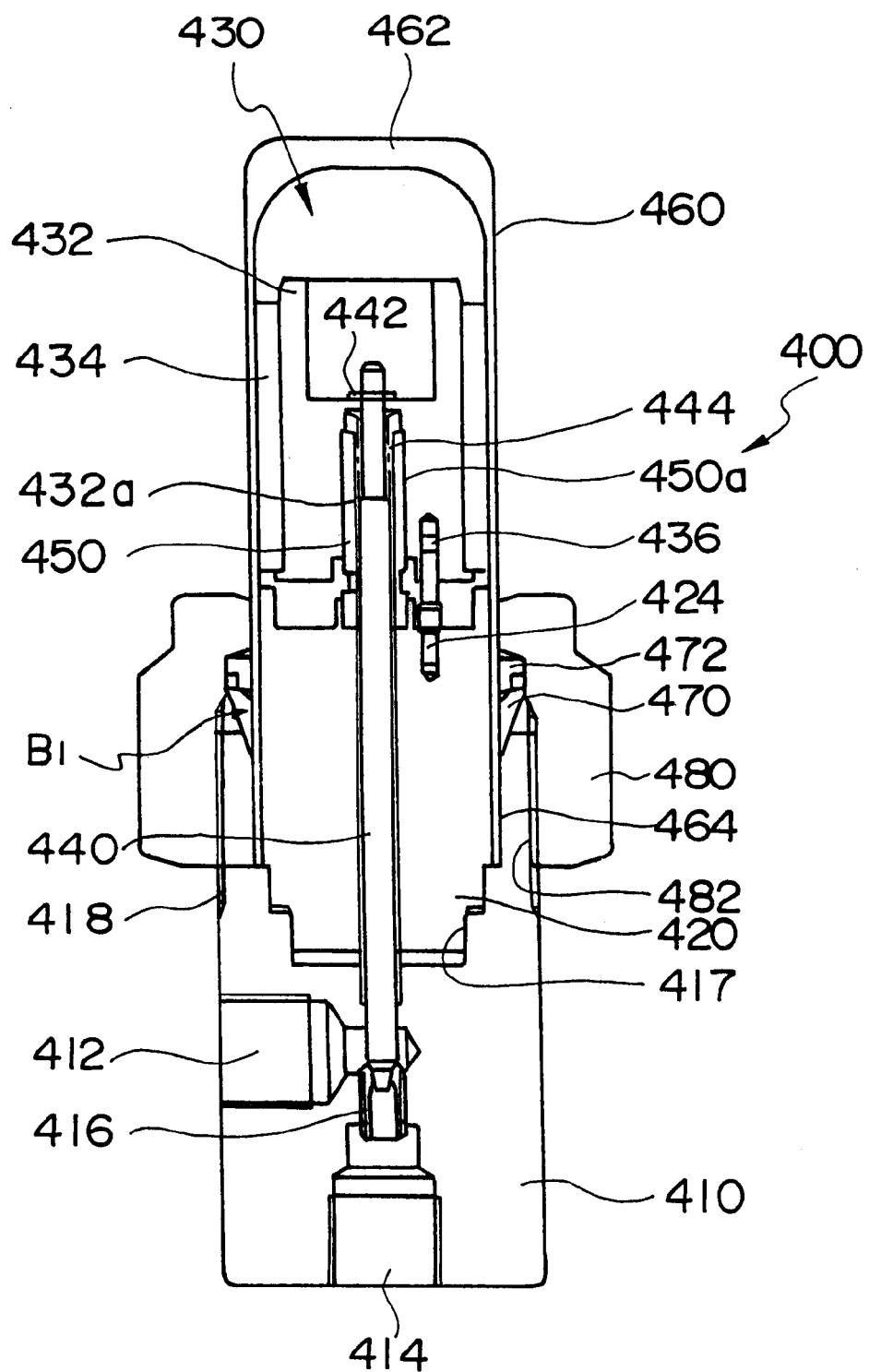
FIG. 5 is a cross-sectional view showing yet another embodiment of the flow control valve according to the present invention.

FIG. 5 is a vertical cross-sectional view of an electrically operated flow control valve according to another embodiment of the present invention, showing the state in which the stator member is removed therefrom.

The flow control valve of the present embodiment differs differ from the valve shown in FIG. 4, only in the shape of the can. Other compositions are the same, and they both have the same advantages.

An electrically operated flow control valve indicated generally by the reference number 400 comprises a cylindrically shaped valve body 410. The valve body 410 is made for example of stainless steel material, and comprises a first passage 412, a second passage 414, and an orifice member 416 mounted between the first passage 412 and the second passage 414.

A rotor member 430 is equipped inside a can 460, and the rotor member includes an integrally assembled magnet member 434 placed on the outer peripheral portion of a sleeve 432.

In the center of the sleeve 432 is formed a female screw portion 432a, which engages to a male screw portion 450a formed on the outer peripheral portion of a guide member 450 vertically equipped to an inner-cylinder member 420 fit to a step portion 417 formed to the valve body 410.

A valve shaft 440 is penetrated through the center portion of the sleeve 432, and the shaft is supported by a fixing member 442, such as an E-ring and the like. The valve shaft 440 is normally biased toward the orifice member 416 by a spring 444 mounted between the shaft and the sleeve 432.

A pin 436 mounted to the sleeve 432 makes contact with a stopper 424 mounted to the cylinder member 420 when the rotor member 430 descends to its lowermost position, thereby limiting the lower limit position of the rotor member.

The can 460, formed by stainless steel, comprises a peak portion with a thickened portion 462, and the lower end of the can is formed as a straight pipe-like portion 464 with an opening.

The can 460 is sandwiched and fixed between the valve body 410 and the inner-cylinder member 420. With two wedge-shaped first ring member 470 and second ring member 472 (so-called a swage lock) mounted therebetween, a box nut 480 is engaged and screwed onto a screw portion 418 formed to the valve body 410. The two wedge-shaped ring members 470 and 472 receiving pressure from the box nut 480 presses the can 460 strongly from the outside to the inner direction by their wedging action, and thereby form a deformed portion $B_1$ which protrudes inwardly.

Figure 6:
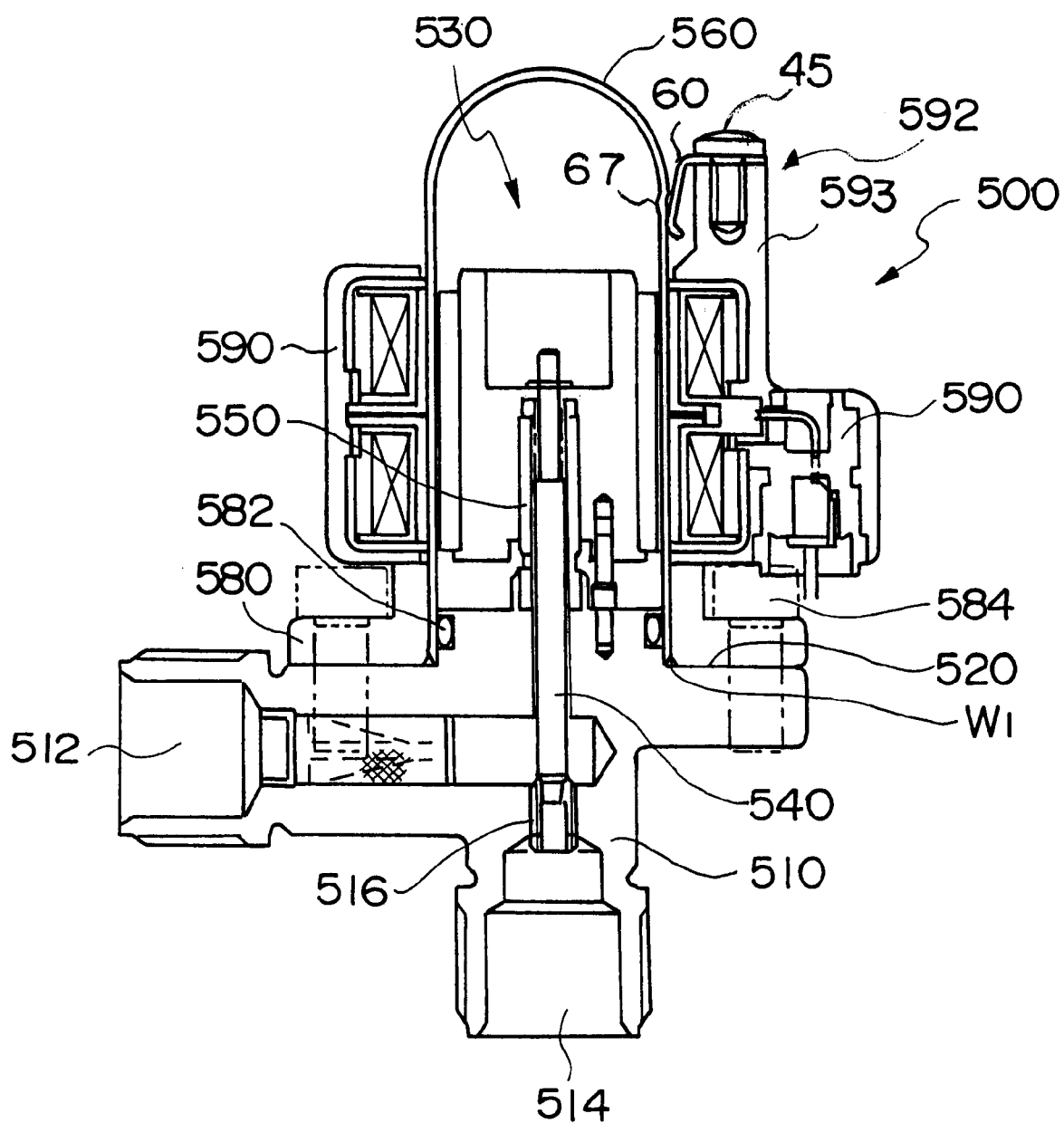
FIG. 6 is a cross-sectional view showing another embodiment of the electrically operated flow control valve according to the present invention.
Figure 7:
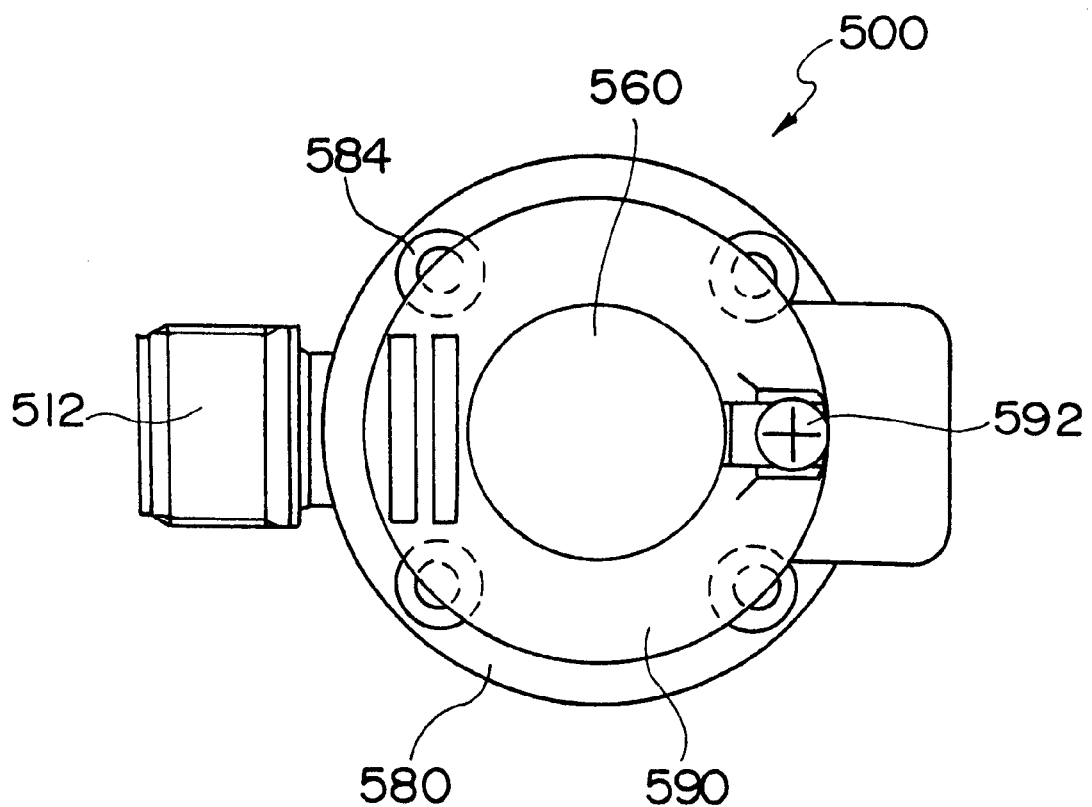
FIG. 7 is a plan view of FIG. 6.

FIG. 6 is a vertical cross-sectional view of yet another embodiment regarding the electrically operated flow control valve with a stator element according to the present invention, and FIG. 7 is a plan view thereof.

An electrically operated flow control valve indicated generally by the reference number 500 comprises a cylindrically shaped valve body 510. The valve body 510 is made for example of stainless steel material, and comprises a first passage 512, a second passage 514, and an orifice member 516 mounted between the first passage 512 and the second passage 514.

A rotor member 530 is equipped inside a can 560, and when power is provided to a stator 590 so as to excite the stator, the rotor member 530 is rotated, and the valve shaft 540 is moved to the vertical direction by the operation of the guide member 550 equipped with a screw mechanism. This mechanism is the same as that explained in the earlier embodiment, so the detailed explanation is omitted.

The can 560 is formed for example by press-working a stainless steel material. The peak portion of the can is formed as a dome portion, so as to effectively receive the inner pressure.

The opening of the can 560 is formed to have a straight tube-like shape, and is connected integrally to a flange member 580, formed for example of stainless steel material, by a weld joint $W_1$.

The flange member 580 formed integrally to the can 560 is fit to a valve body 510 through a seal ring 582, and is fixed to the valve body 510 by bolts 584.

In the present embodiment, four bolts 584 were used, but the number of bolts to be used may be selected according to need. Further, reference number 592 shows a supporting means for fastening the stator 590 to the can 560.

As explained, the electrically operated flow control valve 500 according to the present embodiment includes a can 560 whose opening portion is connected integrally to a flange member 580 by a weld joint, and the flange member 580 is connected to a valve body 510 by plurality of bolts 584. According to such structure, the flange member 580 is used as a block body, so no distortion, or the like, will occur when the weld joint is formed. Even further, since the can 560 is firmly fixed to the valve body 510, the valve may endure a long-term active pressure while preventing the can 560 and the valve body 510 from separating. Moreover, the sealed state between the can 560 and the valve body 510 may be maintained by the seal ring.

Further, a stopper means 592 is formed as follows. On the upper surface of the stator 590 is integrally formed a mounting platform 593 having a predetermined height and protruding therefrom. On the upper surface of the mounting platform 593 is fixed a press stopper 60 made of sheet metal fixed thereto by a screw 45 and through a washer 47. The press stopper 60 prevents the stator 590 from rotating against the can 560 or falling from the can 560. As shown in detail in FIG. 7, the press stopper 60 formed by press-forming comprises a mounting plate 64 to which a hole 65 for threading the screw 45 is formed, and an inverse-L-shaped spring portion 62 including a horizontal side portion 62b connected to the plate 64 and a vertical side portion 62a. Further, a spherical stopper-convex portion 66 having a relatively small height is formed so as to protrude from the substantially center area of the outer surface of the vertical side portion 62a of the spring portion 62. The vertical side portion 62a is formed so that it may be elastically bent toward or away from the side surface 593a of the mounting platform 593 with its base point positioned at a load supporting point P placed at the boundary portion (corner portion) between the vertical side portion 62a and the horizontal side portion 62b.

The the other hand, four connecting concave portions 67 are formed to the upper outer peripheral surface of the can 560, which are all placed on the same plane and with a predetermined angular spacing therebetween (90 degrees in the drawing). The four connecting concave portions 67 are formed as a relatively shallow spherical dent formed so as to interfit with the stopper convex portion 66 equipped to the spring portion 62 of the press stopper 60.

Figure 8:
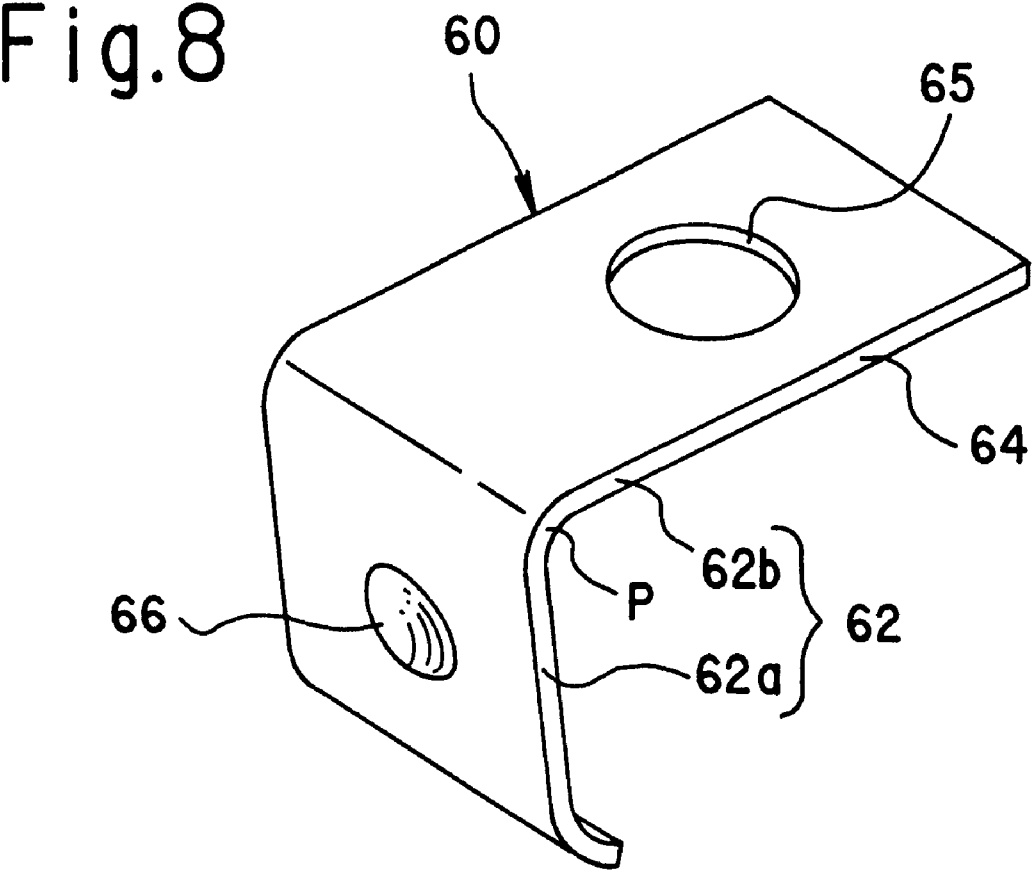
FIG. 8 is a perspective view showing the stopper used in the flow control valve shown in FIG. 6.

Normally in the electrically operated valve formed as above, the can 560 and the valve body are assembled and fixed in advance as an expansion valve to devices such as air conditioners. Further, the assembly position (the position in the rotating direction) of the stator 590 to the can 560 must be changed according to the pull-out direction of a cable (which differs according to the design of each device). Therefore, when assembling the stator 590 to the can 560, as shown in FIG. 8, the stator 590 is rotated against the can 560 while being pressed downward from the upper direction, and the stopper convex portion 66 of the press stopper 60 is fit to one of the four connecting concave portions 67. The concave portion 67 is selected so that the cable may be positioned at an appropriate pull-out position. The stator 590 is pushed and rotated so that the selected connecting concave portion 67 and the stopper convex portion 66 interfit.

Figure 9A:
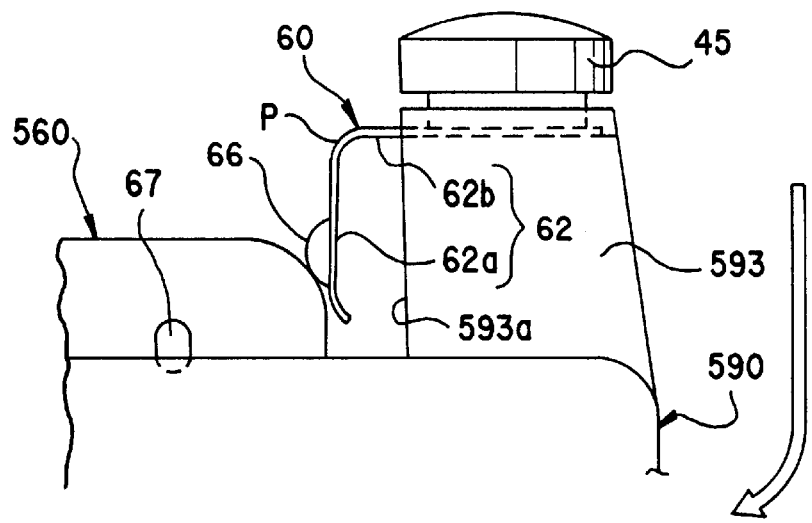
FIG. 9 is an explanatory view of the stopper showing the state in which the stator is assembled on the can in the flow control valve shown in FIG. 6.
Figure 9B:
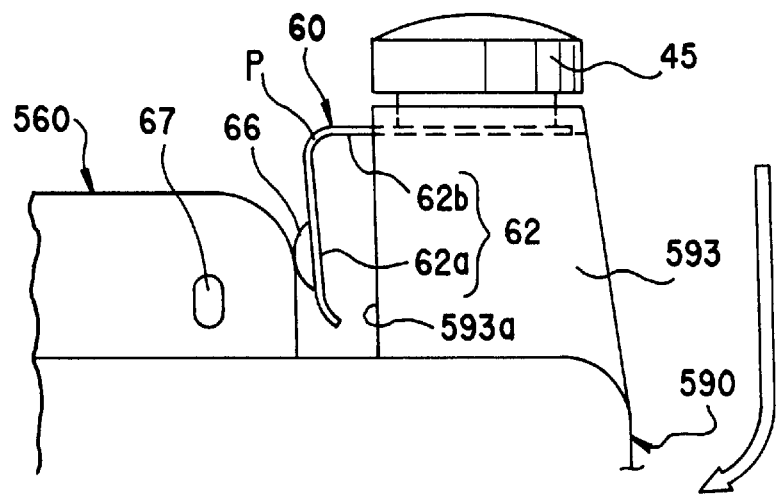
Figure 9C:
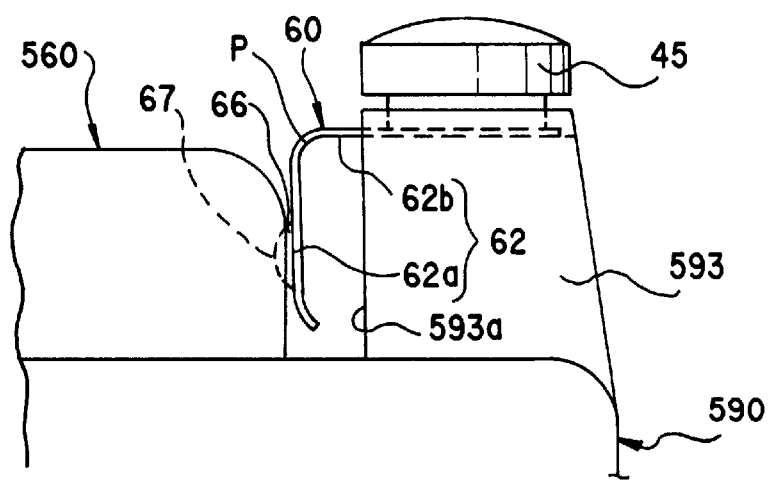

Accordingly, as shown in FIGS. 9(A) and 9(B), the stopper convex portion 66 of the press stopper 60 is pressed outward by the outer surface of the can 560, and the vertical side portion 62a of the spring portion 62 in the press stopper 60 is bent toward the side surface 593a of the mounting platform 593 with its base point positioned at the at the load supporting point P. Thereafter, when the position of the stopper convex portion 66 and the position of the connecting concave portion 67 substantially match, the elasticity of the spring portion 62 pushes back the vertical side portion 62a toward the can 560, and the stopper convex portion 66 interfit with the connecting concave portion 67. Thereby, the convex portion 66 presses against the concave portion 67, and as shown in FIG. 9(C), the stator 590 is prevented from rotating against, or falling from the can 560.

As explained, by utilizing a press stopper 60, the stator 590 may be prevented from rotating against or falling from the can 560. This enables the positioning and the assembling of the stator 590 against the can 560 to be performed by a very simple and easy operation.

Figure 10:
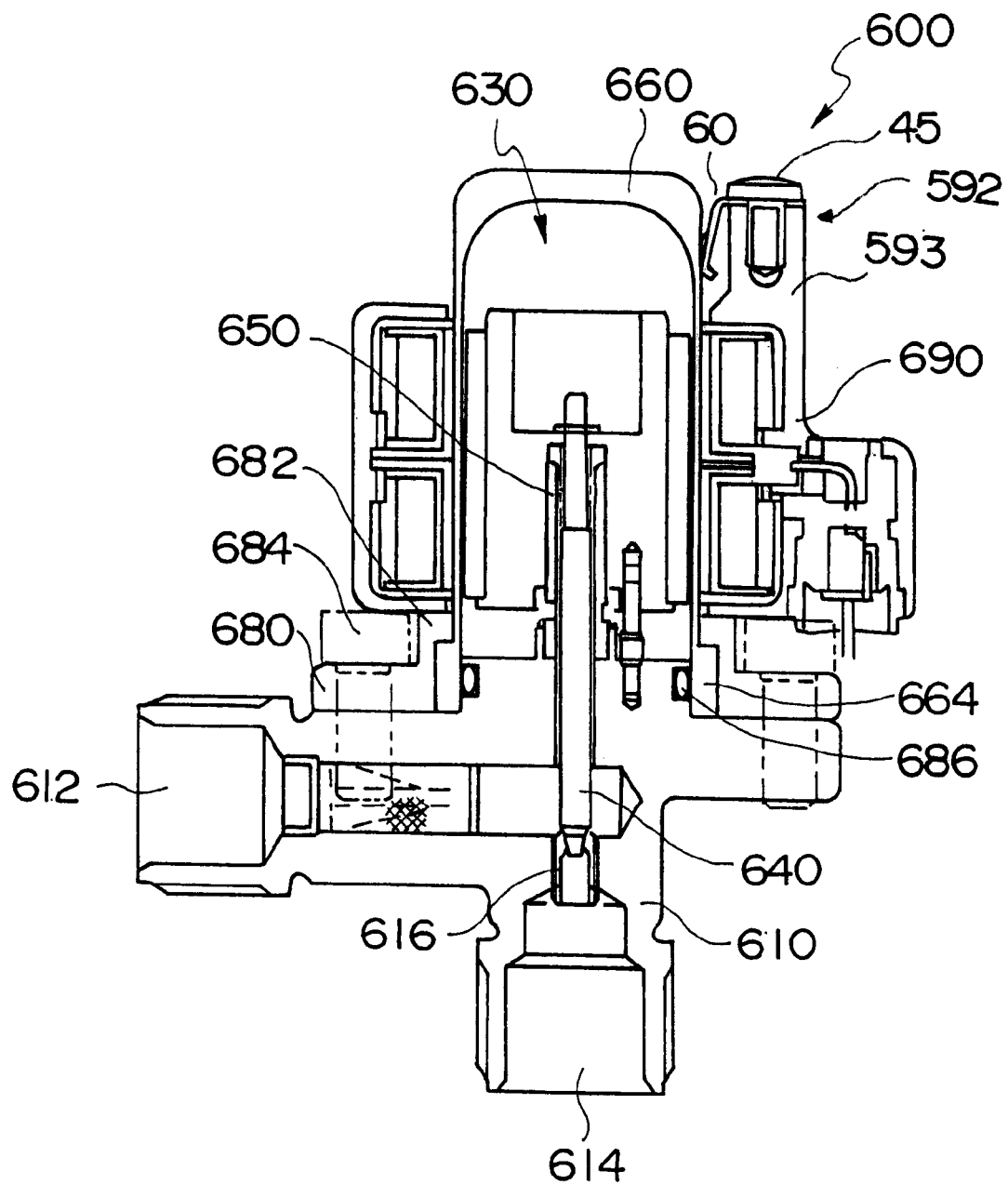
FIG. 10 is a cross-sectional view showing yet another embodiment of the electrically operated flow control valve according to the present invention.

FIG. 10 is a vertical cross-sectional view of yet another embodiment regarding the electrically operated flow control valve with a stator member according to the present invention.

An electrically operated flow control valve by the reference number 600 comprises a cylindrically shaped valve body 610. The valve body 610 is made, for example, of aluminum alloy, and comprises a first passage 612, a second passage 614, and an orifice member 616 mounted between the first passage 612 and the second passage 614.

A rotor member 630 is equipped inside a can 660 and, when power is provided to a stator 690 so as to excite the stator, the rotor member 630 is rotated, and the valve shaft 640 is moved to the vertical direction by the operation of a guide member 650 equipped with a screw mechanism. This mechanism is the same as that explained in the earlier embodiment, so the explanation thereof is omitted.

The can 660 comprises a peak portion with a thickened portion formed by stainless steel, and the lower end of the can is formed to have a pipe-like shape with a step portion 664.

The opening of the can 660 is formed to have a straight-tube shape, with a step portion 664 extending to the outer peripheral direction from the opening. A flange member 680 is formed of a stainless steel material, and comprises a rim portion 682 with steps which interfit with the step portion 664 of the can 660.

The can 660 is fit to the valve body 610 through a seal ring 686, and the flange member 680 is fixed to the valve body 610 by bolts 684.

Four bolts 684 were used in the present embodiment, but the number of bolts may be varied according to need.

As explained, the electrically operated flow control valve 600 of the present embodiment includes connecting the can 660 to the flange member 680 by interfitting the step portion formed to the opening of the can 660 and the rim portion of the flange member 680, and further connecting the flange member 680 to the valve body 610 by bolts 684. Accordingly, the can 660 may be firmly fixed to the valve body 610 through only a mechanical connection. The present embodiment offers a flow control valve capable of enduring a long-term active pressure while preventing the can 660 and the valve body 610 from separating, and which could be manufactured by reduced assembling steps.

Moreover, similar to the embodiment of FIG. 6, the embodiment of FIG. 5 may also be designed so that the can and the flange portion are connected by interfitting the step portions formed thereto.

Figure 11:
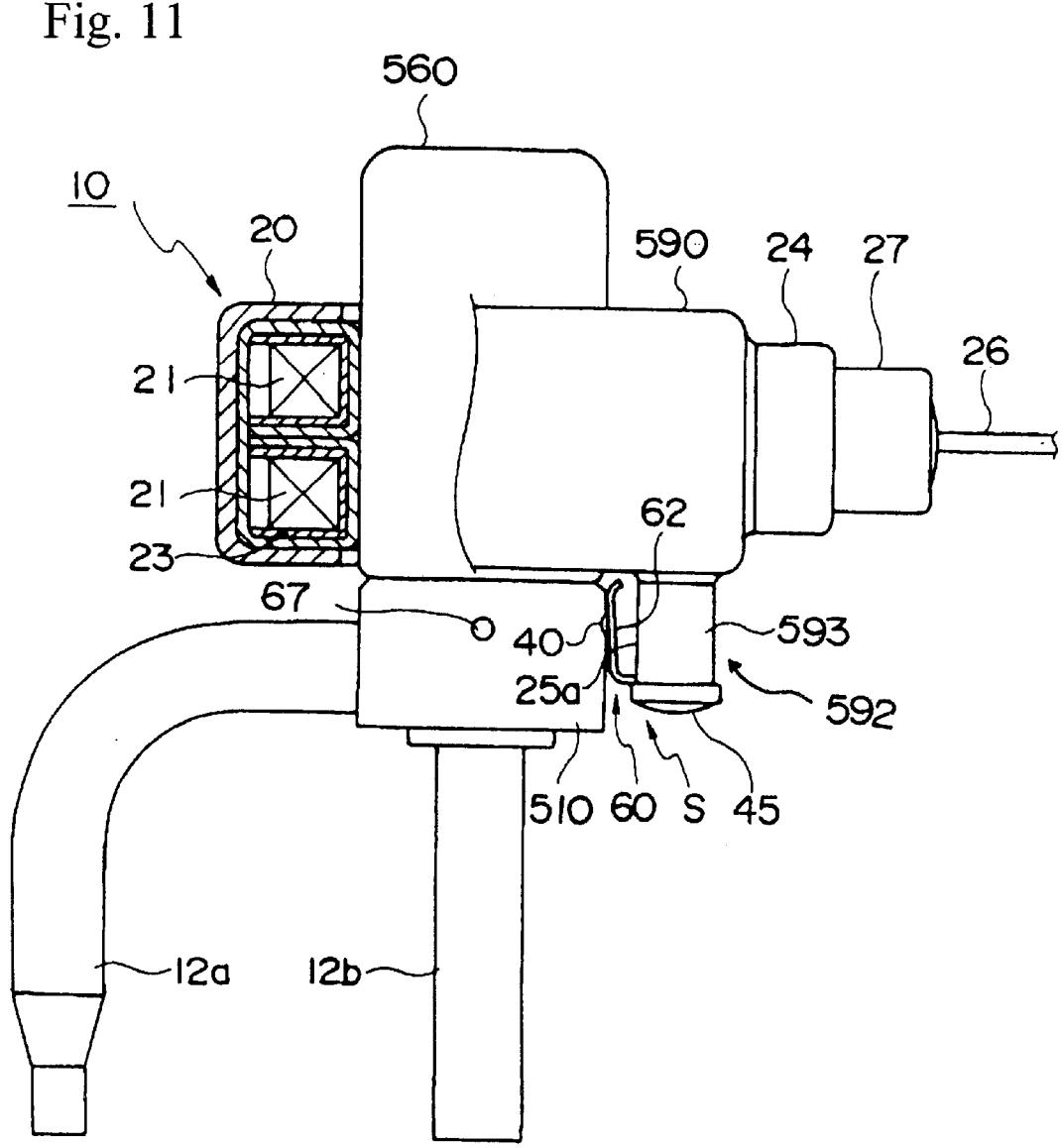
FIG. 11 is a cross-sectional view showing yet another embodiment of the flow control valve according to the present invention.
Figure 12:
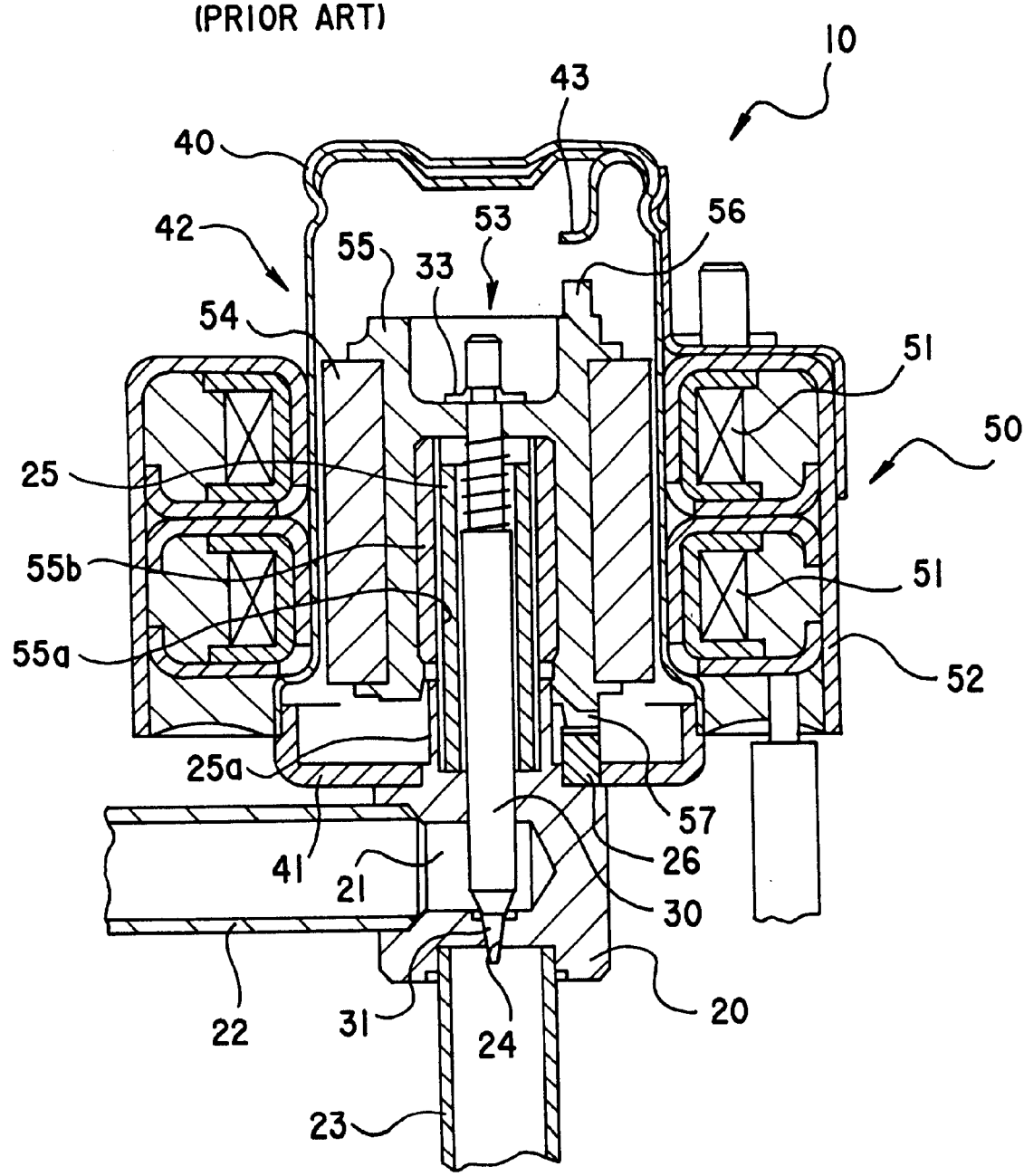
FIG. 12 is a cross-sectional view showing the electrically operated flow control valve of the prior art.

FIG. 11 is a vertical cross-sectional view showing yet another embodiment of the electrically operated flow control valve of the present invention. The present embodiment characterizes in that the stopper means 592 is mounted to the lower surface of the stator 590. This differs from the embodiments shown in FIGS. 5 and 9 where the stopper means 592 is mounted to the upper surface of the stator 590.

According to FIG. 11, a can 560 is made of a stainless steel material, and a valve body 510 is also formed of a stainless steel material. The can and the valve body are fixed to each other through welding, thereby forming a firm fixture between the can and the valve body with a sealed property.

A plurality of connecting concave portions 67, three for example, are formed to the outer peripheral surface of the valve body 510. The valve body 510 and the stator 590 constitute a space S, and a mounting platform 593 is mounted to the lower surface of the stator 590 and protruding therefrom so as to be positioned within the space S. Therefore, the press stopper 60 is equipped to the mounting platform 593 in the opposite direction as in the embodiments shown in FIG. 5 and FIG. 9.

As shown in FIG. 11, in the electrically operated flow control valve formed as above, when assembling the stator 590 to the can 560, the stator 590 is pressed downward and rotated against the can 560 from the upper direction. Thereafter, the stopper convex portion 66 of the press stopper 60 is interfit to one of the four connecting concave portions 67 formed to the valve body 510. The interfitting concave portion 67 is selected so that when the stopper convex portion 66 is fit thereto, the cable may be positioned at an appropriate pull-out position. The stator 590 as a whole is pressed and rotated against the can so that the stopper convex portion 66 is placed at a position corresponding to the selected connecting concave portion 67.

Thereby, the stopper convex portion 66 of the press stopper 60 is pressed outward by the outer peripheral surface of the valve body 510, and the vertical side portion 62a of the spring portion 62 in the stopper 60 is bent toward the side surface 593a of the mounting platform 593 with its base point at the load support point P. Thereafter, when the position of the stopper convex portion 66 and the connecting concave portion 67 substantially match, the elasticity of the spring portion 62 pushes back the vertical side portion 62a toward the valve body 510, and the stopper convex portion 66 and the connecting concave portion 67 interfit. The convex portion 66 is pressed elastically against the concave portion 67, thereby preventing the stator 590 from rotating against or falling from the can 560.

In the present embodiment, the stopper convex portion 66 is formed on the press stopper 60 and the four connecting concave portions 67 are formed to the valve body 510. However, the concave portion may be formed on the press stopper 60 and four convex portions may be formed on the valve body 510 instead. Moreover, the number of the connecting concave portions or the stopper convex portions formed on the valve body 510 may be selected according to need from two (with 180-degree intervals), three (with 120-degree intervals), six (with 60-degree intervals), and so on.

Moreover, the connecting concave portion may be formed as a bottomless round hole (opening), or the like, instead of the spherical dent. Further, the press stopper is not necessarily made of sheet metal, but may also be formed of synthetic resin, or of a metal stick-shaped member where the stopper portion is formed by bending the tip portion thereof.

In the electrically operated flow control valve shown in FIG. 11, the mounting platform equipped with a press stopper for positioning the stator is formed to protrude from the lower surface of the stator. Therefore, the spaces near the valve body may be utilized efficiently, and the mounting process of the valve may be simplified.

Further, in FIG. 11, reference numbers 12a and 12b show flow-in/flow-out passages, 24 and 27 show connectors, and 26 shows a lead wire.

As explained above, the electrically operated flow control valve according to the present invention is characterized in that the valve body and the can are fixed firmly together, so that when performing a flow control of refrigerants such as $CO_2$ used under high pressure, the can and the valve body are prevented from separating, and the sealed state between the can and the valve body may be maintained, thereby enabling to improve the reliability of the valve.

We claim:

1. An electrically operated flow control valve comprising a valve body, a cylindrical can fixed to an upper portion of said valve body, and a motor including a rotor disposed within the interior of said can and a stator disposed on the exterior of said can; wherein said stator is fixed to said valve body through a press stopper disposed between said stator and said valve body.

2. An electrically operated flow control valve according to claim 1, wherein said press stopper is disposed on a mounting platform mounted to the upper surface of said stator.

3. An electrically operated flow control valve according to claim 2, wherein said press stopper has elasticity.

4. An electrically operated flow control valve according to claim 1, wherein said press stopper is disposed on a mounting platform mounted to the lower surface of said stator.

5. An electrically operated flow control valve according to claim 4, wherein said press stopper has elasticity.

6. An electrically operated flow control valve according to claim 1, wherein said press stopper has elasticity.

* * * * *